United States Patent [19]
Leponen et al.

[11] Patent Number: 5,147,440
[45] Date of Patent: Sep. 15, 1992

[54] APPARATUS FOR BENDING A GLASS SHEET SUPPORTED ON A RING MOULD

[75] Inventors: Mauri E. Leponen; Erkki Yli-Vakkuri; Kalevi Lind, all of Tampere, Finland

[73] Assignee: Tamglass Oy, Tampere, Finland

[21] Appl. No.: 713,073

[22] Filed: Jun. 11, 1991

[30] Foreign Application Priority Data

Apr. 26, 1991 [FI] Finland ............... 912022

[51] Int. Cl.[5] ............................. C03B 23/03
[52] U.S. Cl. ........................ 65/287; 65/173; 65/273
[58] Field of Search ............... 65/106, 172, 173, 273, 65/287

[56] References Cited

U.S. PATENT DOCUMENTS

| | | | |
|---|---|---|---|
| 4,125,253 | 11/1978 | Wangermann | 270/58 |
| 4,260,408 | 4/1981 | Reese et al. | 65/106 |
| 4,349,375 | 9/1982 | Kellar et al. | 65/106 |
| 4,497,645 | 2/1985 | Peltonen | 65/107 |
| 4,589,901 | 5/1986 | Yoshizawa et al. | 65/106 |
| 4,804,397 | 2/1989 | Stas et al. | 65/107 |
| 4,892,574 | 1/1990 | Cortes | 65/273 |
| 4,909,820 | 3/1990 | Hirotsu et al. | 65/106 |
| 4,986,842 | 1/1991 | Peltonen | 65/104 |
| 5,049,178 | 9/1991 | Pereman et al. | 65/106 |
| 5,066,320 | 11/1991 | Lehto et al. | 65/106 |
| 5,078,770 | 1/1992 | Lehto et al. | 65/25..4 |
| 5,079,931 | 1/1992 | Lehto et al. | 65/288 |

FOREIGN PATENT DOCUMENTS

3706886 1/1981 European Pat. Off. .
0338216 10/1989 European Pat. Off. .
33922 9/1988 Fed. Rep. of Germany .

*Primary Examiner*—Joye L. Woodard
*Attorney, Agent, or Firm*—Burns, Doane, Swecker & Mathis

[57] ABSTRACT

An apparatus for bending a glass sheet supported on a ring mould including a press-bending station provided with a plurality of thermally insulated walls, a press-bending tool assembly arranged above the glass sheet supported on a ring mould in the press-bending station, a claw crane mounted in the station for raising and lowering said press-bending tool assembly which includes first and second articulated arms connected to each other along a common axis of rotation. The first articulated arm has one end fixed to a ceiling in the press-bending station and an opposite end movable along the press-bending tool assembly. The second articulated arm has one end fixed to the press-bending tool assembly and an opposite end movable in a horizontal plane along the ceiling of the press-bending station. A power unit is located outside the station. A driving rod connects to the movable end of the second arm and is driven by the power unit through one of the walls such that the press-bending tool assembly is raised and lowered according to the horizontal movement of the movable end of the second articulated arm.

10 Claims, 4 Drawing Sheets

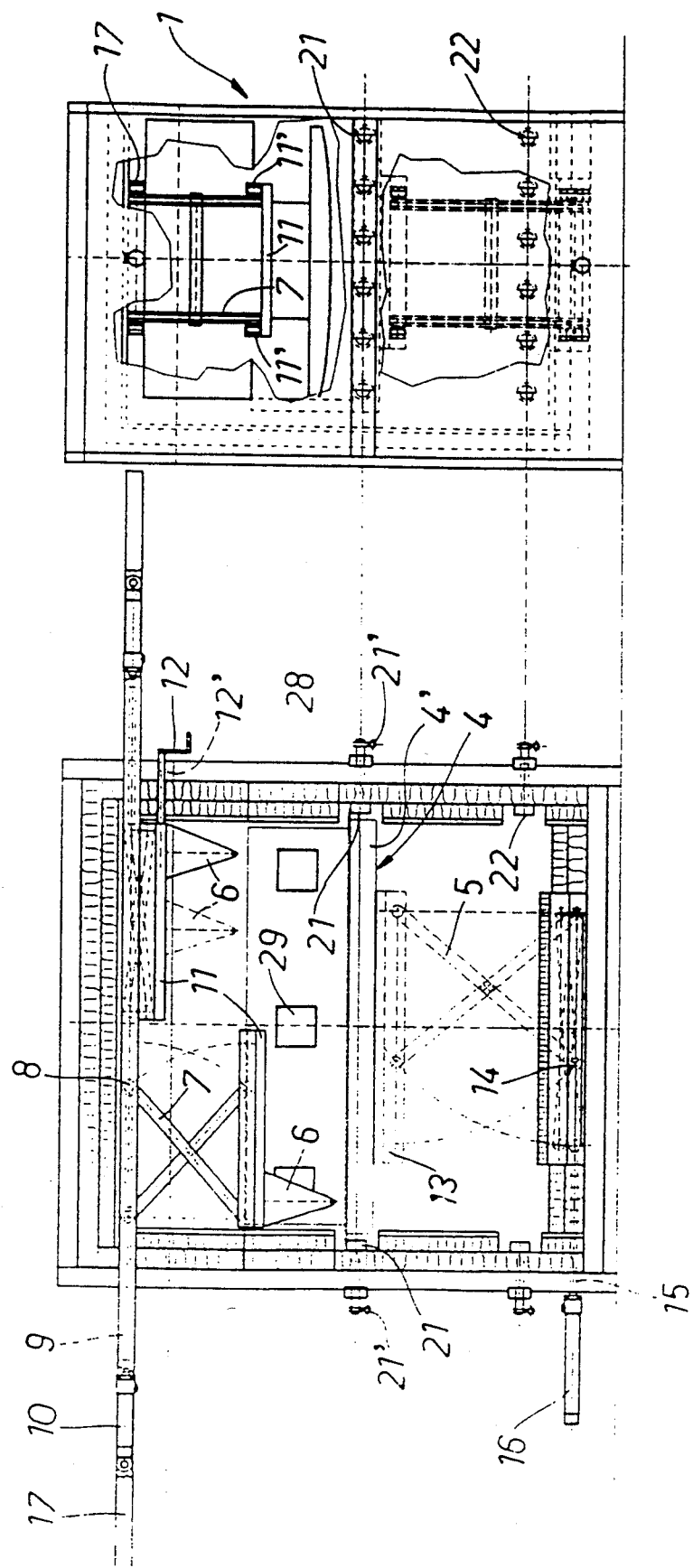

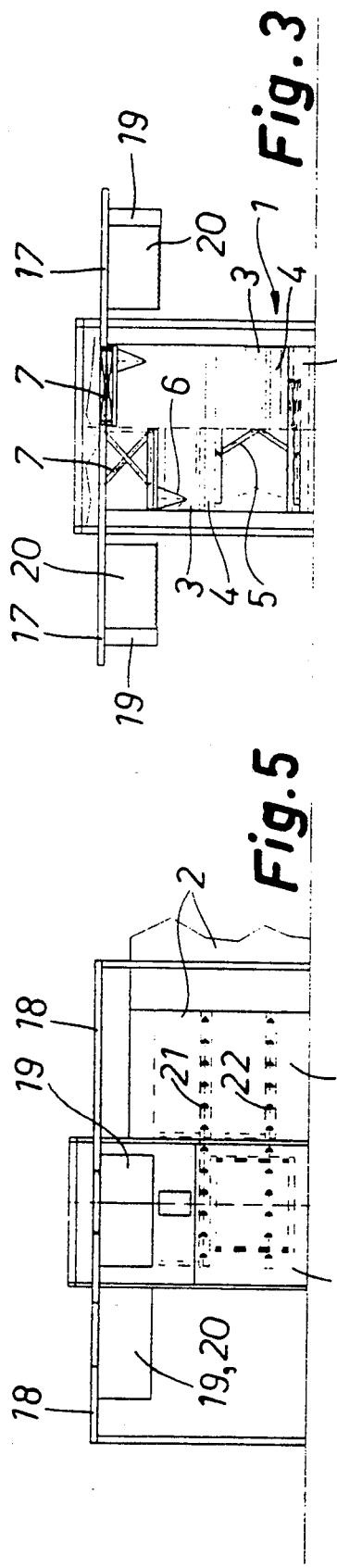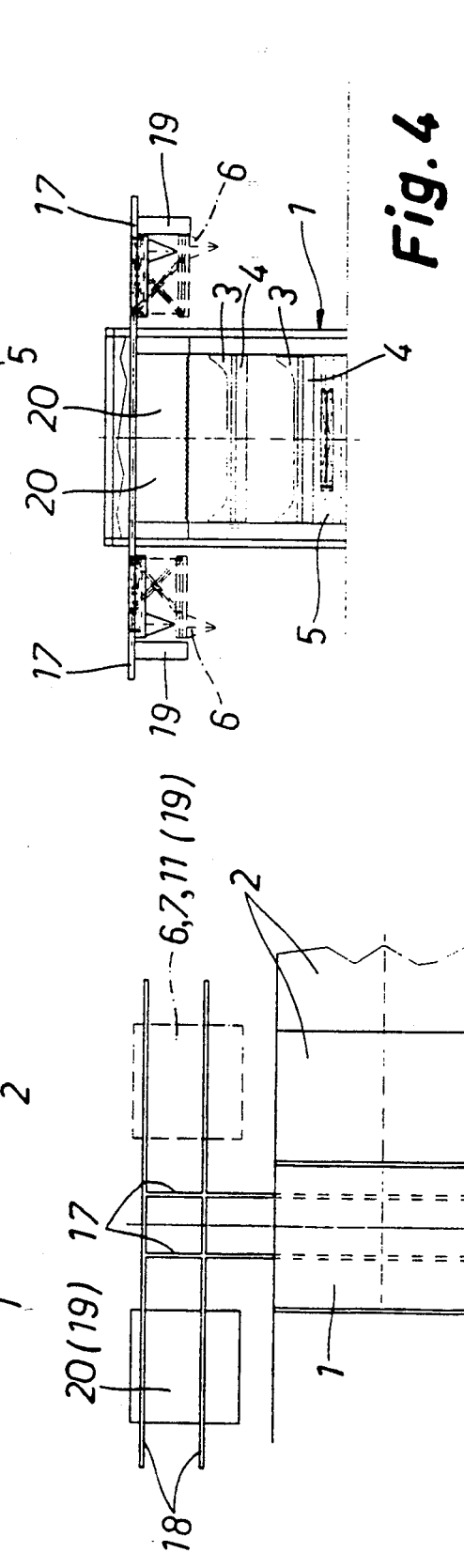

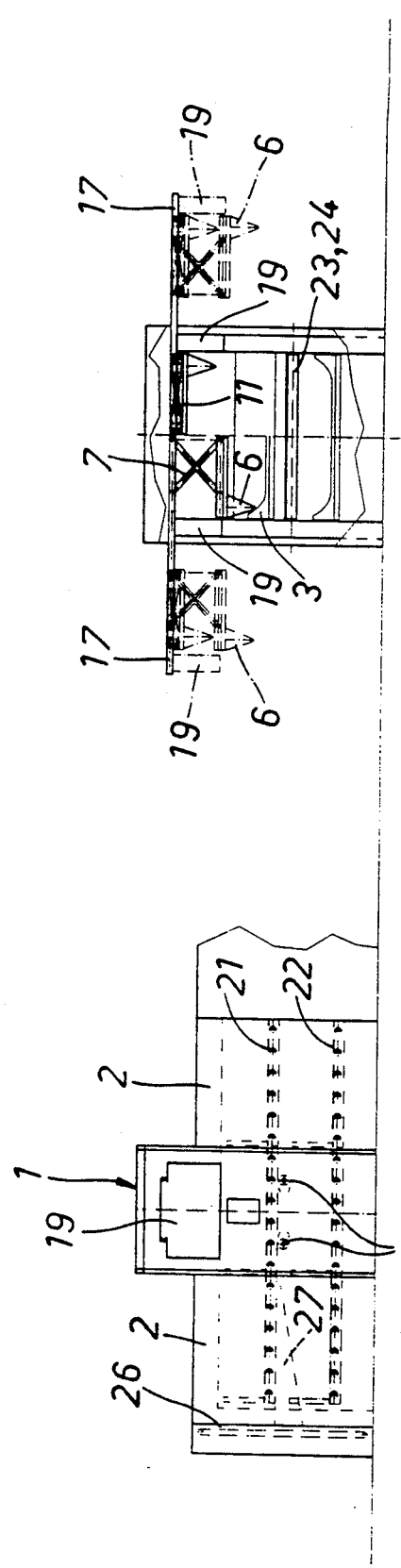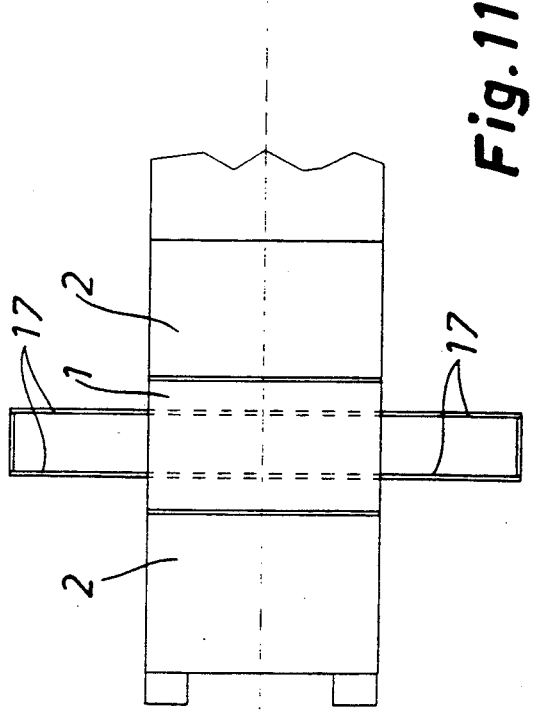

APPARATUS FOR BENDING A GLASS SHEET SUPPORTED ON A RING MOULD

BACKGROUND AND SUMMARY OF THE INVENTION

The present invention relates to an apparatus for bending a glass sheet supported on a ring mould, said apparatus comprising a press-bending station provided with thermally insulated walls, a press-bending tool above a ring-mould supported glass sheet in the press-bending station, as well as a mechanism for lifting and lowering the press-bending tool This type of glass-bending apparatus is disclosed in Patent publication U.S. Pat. No. 4 804 397. In that publication, the movements of a press tool for positioning and pressing are effected by means of a linkage driven through the station wall and the movements of such linkage require a relatively large through hole in the station wall. In addition, the mechanism is quite complicated and expensive and the accurate control of movements is difficult to obtain. The laid-open application EP 0338216 discloses a glass-bending apparatus, wherein a complicated moving mechanism for a press-bending tool is for the large part thereof located inside a bending station. However, the strength and proper function of complicated moving mechanisms are very difficult to secure at a glass-bending temperature.

An object of the invention is to provide an improved apparatus for moving or carrying a glass sheet press-bending tool in a bending station Particularly, the mechanisms capable of operating in the heat of a bending station must be structurally as simple as possible while the operation thereof should not require through holes that are difficult to seal.

This object is achieved on the basis of the characterizing features of the invention set forth in the annexed claims.

The invention can be applied e.g. to effect movements of such bending moulds that are described in the Applicants' earlier Finnish Patent applications 901601, 901602 and 901603.

BRIEF DESCRIPTION OF THE DRAWINGS

The invention will now be described in more detail with reference made to the accompanying drawings, in which FIG. 1 shows a cross-section of a press-bending station fitted with an apparatus according to a first embodiment of the invention.

FIG. 2 is a lateral and partially cut-away view of the station of FIG. 1.

FIG. 3 shows the same apparatus as FIG. 1 supplemented, however, with heating devices 20 that can be carried into the station to replace the press-bending mechanisms to be moved out of the station, whereby said station can also be used as a conventional gravity-operated bender.

FIG. 4 shows the apparatus of FIG. 3 in a situation, wherein the press-bending mechanisms have been carried out of the station and heating devices 20 therein.

FIG. 5 is a side view of the apparatus shown in FIGS. 3 and 4.

FIG. 6 shows the same apparatus in a plan view.

FIG. 9 shows the apparatus of FIG. 7, the dash-and-dot lines illustrating the changeover position of a press tool carried out of the station.

FIG. 10 is a side view showing how the station of FIG. 9 is positioned as the penultimate station of a multi-station heating and bending furnace.

FIG. 11 is a plan view of the same apparatus as shown in FIGS. 9 and 10.

DESCRIPTION

Figures 7, 8:
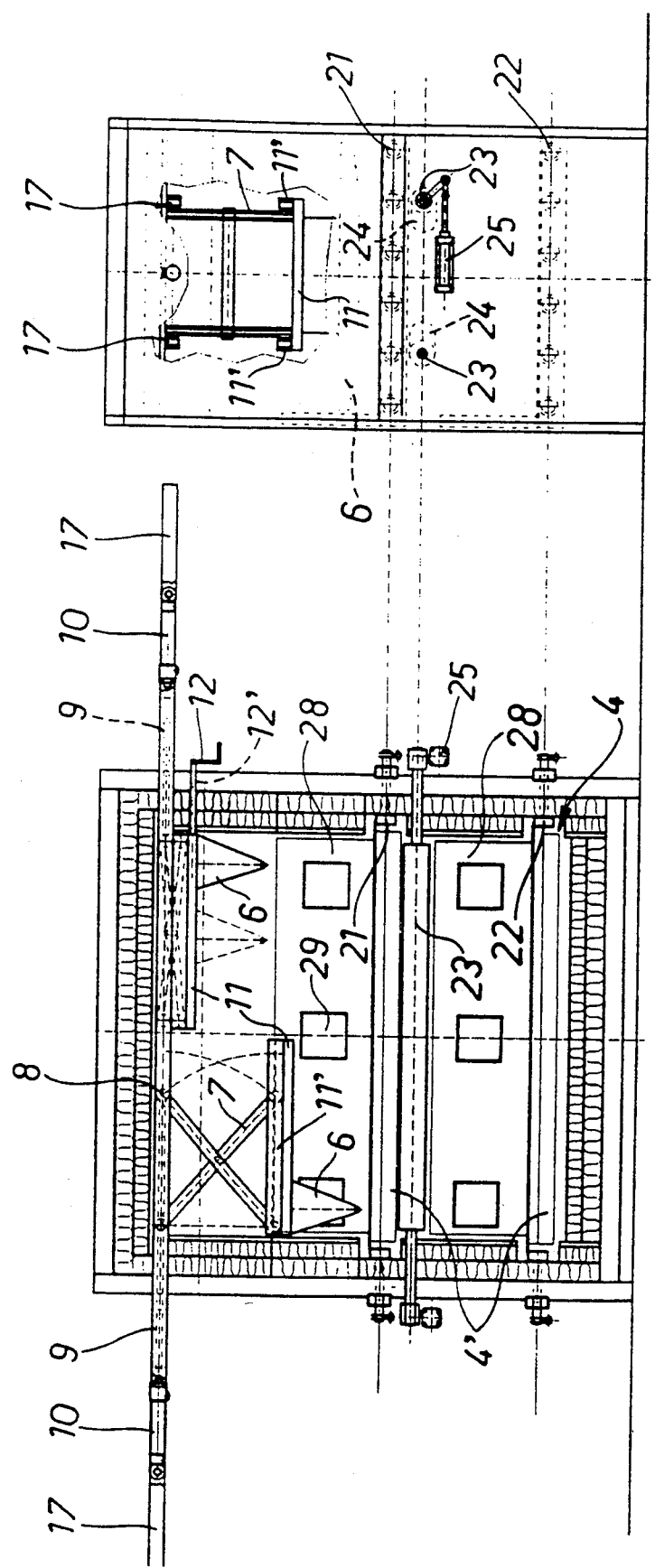
FIG. 7 shows a cross-section of a press-bending station fitted with an apparatus according to a second embodiment of the invention, the overhead bending press being structurally similar to the apparatus shown in FIG. 1.
FIG. 8 is a side view of the press-bending station shown in FIG. 7.

Referring to the embodiment shown in FIGS. 1-6, a press-bending station 1 is mounted on the gable of a furnace assembly downstream of conventional heating and bending stations 2. A glass sheet is supported on a mould 3 which is carried from station to station by means of a mould trolley 4 provided on its sides with supporting rails which rest upon roller tracks 21. Following a bending operation, said mould 3 and trolley 4, together with a glass sheet thereon, are returned along a lower roller track 22 to the upstream end of a furnace assembly for simultaneously cooling a bent glass sheet and having it deliver heat to glass sheets on the upper track, as described in the Applicants' U.S. Pat. Nos. 4 497 645 and 4 986 842.

The carry-over of mould and mould trolly 3, 4 from upper track 21 to lower track 22 is effected by means of a claw crane 5, which is located in press-bending station 1 and one of whose articulated arms has its bottom end 14 carrying a driving rod 15 which is reciprocally driven in horizontal direction (lengthwise direction of rod 15) by a piston-cylinder unit 16. The piston-cylinder unit 16 is located outside station 1 and rod 15 has been driven through the station wall by way of a single permanent through hole. The first ends of the arms of claw crane 5 are fixedly secured in position while the second ends are sliding along horizontal guides. Said claw crane 5 has a top section 13 which braces itself against the floor 4' of mould trolley 4. Since, during the course of a press-bending operation, said mould trolley 4 is supported from below with claw crane 5, it is possible to employ conventional mould trolleys 4 intended for gravitational bending. During a press-bending operation, said trolley 4 and a mould 3 carried thereby as well as a glass sheet thereon sit stationary in their position. From one station into another said trolleys 4 are carried in horizontal plane by rotating rollers 21 by means of a cardan shaft 21' located outside the stations. Said trolley 4 has its forward wall 28 provided with windows 29 and its rearward wall with correspondingly positioned windows (not shown) for observing the bending process therethrough.

A press-bending tool 6, whose shape is selected according to a given desired bending shape is replaceably fastened to a frame 11 which in turn is carried by the bottom ends of the articulated arms of claw crane 7. The arms of claw crane 7 have their first ends fixedly mounted and the opposite ends thereof are free to travel along horizontal guides, the first guides (guides 17) being permanently fixed to the station ceiling and the second (guides 11') to frame 11. One articulated arm of claw crane 7 includes an upper end 8, fitted with a driving rod 9 which is horizontally (in its longitudinal direction) movable by a piston-cylinder unit 10. In the present case, a similar claw crane 7 with its driving or operating unit 9, 10 is also mounted on the other side of the centre line of the station. When frame 11 has been lifted by means of claw crane 7 to its top position, a hand crank 12 can be used through the intermediary of its associated driving shaft 12' to shift the position of tool 6 in horizontal plane, as shown with dash-and-dot lines on the right-hand side of the centre line of the station. As the movements of tool 6 occur along vertical and horizontal lines, the position of tool 6 can be accurately defined. The range of tools 6 may extend from partial surface mould to whole surface mould or such tools may be various local press elements for assisting gravitational bending at difficult bending spots.

As shown in FIG. 4, said claw crane 7 together with its tool 6 is adapted to be carried out of station 1 upon rails 17. In order to facilitate this transfer, a section 19 of the station wall is adapted to be carried along as well. For the replacement of tool 6, said tool 6 can be lowered by means of claw crane 7 to the level of or below the bottom edge of wall section 19 for an easy replacement.

In order to effect also conventional, gravity-based bending in press-bending station 1, said bending press 6, 7 can be removed and replaced with heating devices 20. Therefore, the outer ends of transverse rails 17 are fitted with lengthwise rails 18 (FIG. 6), whereby the replacement between units 20 and 6, 7 can be effected by picking up a unit extracted from the station off said rails 17. FIG. 4 illustrates heating devices 20 inside station 1 for carrying out the gravitational bending of a glass sheet placed on mould 3. In the position of FIG. 3, said bending press 6, 7 is located in station 1 and heating devices 20 are outside the station. In all cases, the removable station wall section is designated with the same reference numeral 19.

The embodiment shown in FIGS. 7–11 will now be described only as far as it differs from what is described above. The same or identical components are designated with the same reference numerals as in the embodiment of FIGS. 1–6. As shown in FIGS. 10 and 11, a press-bending station 1 is located between two conventional bending stations 2 as a penultimate station. The final station 2 includes a hoisting gear 26 which is provided with consoles 27 for carrying the mould trolleys from upper track 21 down to lower track 22. Said consoles 27 only need to bear the weight of a mould trolley, a mould and a glass sheet but not the compressive force of a bending press. As shown in FIGS. 7 and 8, the trolly includes a floor 4' having therebelow shafts 23 pivotable by means of piston-cylinder units 25 and including cams 24 which by turning said shafts 23 can be brought to contact with trolly floor 4' for supporting and carrying the trolly during the course of a press-bending operation.

This embodiment does not require replaceable heating devices in press-bending station 1 as said final station 2 is conventionally fitted with permanent heating devices for carrying out gravitational bending in final station 2. However, said bending press 6, 7 is preferably adapted to be shifted out of station 1 for the replacement of tool 6, as shown in FIG. 9.

The above-described solution offers e.g. the following benefits:
 simple construction
 no through holes difficult to seal
 applicable to existing bending furnace assembly
 no specially designed mould trolly required
 can be modified as normal bending station, if necessary
 good visibility both from the end and from the sides for controlled bending (embodiment of FIGS. 1–6)
 glass sheet is immediately subjected to quenching which is beneficial in terms of edge stresses (embodiment of FIGS. 1–6)
 actuators can be kept outside a heated station and just one permanent through hole is required
 accurate control of movements, since only vertical and horizontal linear movements are employed
 tool shifting mechanism can be applied to tools of varying shapes and sizes.

What is claimed is:

1. An apparatus for bending a glass sheet supported on a ring mould, said apparatus comprising:
 a press-bending station provided with a plurality of thermally insulated walls;
 a press-bending tool assembly arranged above the glass sheet supported on a ring mould in the press-bending station;
 a claw crane mounted in said station for raising and lowering said press-bending tool assembly;
 said claw crane including first and second articulated arms connected to each other along a common axis of rotation;
 said first articulated arm having one end fixed to a ceiling in said press-bending station and an opposite end movable along said press-bending tool assembly;
 said second articulated arm having one end fixed to said press-bending tool assembly and an opposite end movable in a horizontal plane along said ceiling of said press-bending station;
 a power unit which is located outside the station; and
 a driving rod connected to said movable end of said second articulated arm and being driven by said power unit through one of said walls such that said press bending tool assembly is raised and lowered according to horizontal movement of said movable end of said second articulated arm.

2. An apparatus as set forth in claim 1, wherein said press-bending tool assembly includes a press-bending tool and a frame for holding said press-bending tool, said frame being attached to said claw crane at said movable end of said first articulated arm and said fixed end of said second articulated arm, said press-bending tool assembly further including a driving shaft connected to said press-bending tool for horizontally moving said press-bending tool when said frame is positioned by the claw crane to a top position, said driving shaft being driven through one of said walls.

3. An apparatus as set forth in claim 2, wherein said driving shaft includes a hand crank.

4. An apparatus as set forth in claim 1, wherein said claw crane and a section of one of said walls are movable out of said press-bending station upon rails mounted along said station.

5. An apparatus as set forth in claim 4, wherein said press-bending tool assembly includes a frame and an interchangeable press-bending tool fastened thereto and wherein said frame is movable by said claw crane to a position below said movable station wall section for changing said press-bending tool outside of said press-bending station.

6. An apparatus as set forth in claim 4, including a multi-station heating and bending furnace in which said press-bending station is located, said furnace including transverse rails extending from opposite sides of said furnace, said transverse rails being linked with lengthwise rails and wherein a plurality of heating devices are movably positioned along said transverse and lengthwise rails, said heating devices being movable to a position inside said station after said press-bending tool assembly and said claw crane have been carried outside said station.

7. An apparatus as set forth in claim 1, including a second separately movable claw crane in said station for raising and lowering a second press-bending tool assembly, said claw cranes being arranged opposite each other in said press-bending station.

8. An apparatus as set forth in claim 1, wherein said ring mould is supported on a mould-carrying trolly and wherein ascendable and descendable means for bracing said mould trolly during a press-bending operation are disposed below said trolly.

9. An apparatus as set forth in claim 8, wherein said means for bracing includes a supporting cam mounted eccentrically in said station and connected to a pivotable shaft extending through one of said walls, and wherein a power unit is disposed outside the station and is connected to said pivotable shaft for pivoting said shaft.

10. An apparatus as set forth in claim 8, wherein said means for bracing includes a claw crane, said claw crane including first and second articulated arms connected to each other along a common axis of rotation;

said first articulated arm having one end fixed to a floor in said press-bending station and an opposite end movable along a mold trolly platform;

said second articulated arm having one end fixed to said platform and an opposite end movable in a horizontal plane along said floor of said press-bending station, said movable end of said second articulated arm being connected to a driving rod extending through one of said walls, said rod being drivable by a power unit which is located outside the station.

* * * * *